United States Patent [19]

Burgoyne, Jr. et al.

[11] Patent Number: 4,985,159
[45] Date of Patent: * Jan. 15, 1991

[54] ALKENYLATED TOLUENEDIAMINES AS ANTIOXIDANTS FOR ORGANIC MATERIALS

[75] Inventors: William F. Burgoyne, Jr., Emmaus, Pa.; Dale D. Dixon, Venice, Fla.

[73] Assignee: Air Products and Chemicals, Inc., Allentown, Pa.

[*] Notice: The portion of the term of this patent subsequent to Dec. 22, 2005 has been disclaimed.

[21] Appl. No.: 108,332

[22] Filed: Oct. 14, 1987

Related U.S. Application Data

[63] Continuation-in-part of Ser. No. 768,885, Aug. 23, 1985, Pat. No. 4,745,223, which is a continuation-in-part of Ser. No. 659,597, Oct. 11, 1984, abandoned, and a continuation-in-part of Ser. No. 837,461, Mar. 7, 1986, Pat. No. 4,714,778.

[51] Int. Cl.$^5$ .................... C10M 133/12; C10L 1/22
[52] U.S. Cl. ........................ 252/50; 252/401; 44/430; 524/254
[58] Field of Search ............. 252/50, 401, 384, 390; 564/305; 524/254; 44/72

[56] References Cited

U.S. PATENT DOCUMENTS

| | | | |
|---|---|---|---|
| 2,645,674 | 7/1953 | Kinney | 260/759 |
| 2,692,287 | 10/1954 | Bell | 260/674 |
| 2,692,288 | 10/1954 | Bell | 260/576 |
| 3,230,257 | 1/1966 | Schmerling | 260/576 |
| 3,923,892 | 12/1975 | Klopfer | 260/578 |
| 4,456,541 | 6/1984 | Wright | 252/50 |
| 4,693,837 | 9/1987 | Dixon | 252/50 |
| 4,714,778 | 12/1987 | Burgoyne | 564/307 |

*Primary Examiner*—Olik Chaudhuri
*Assistant Examiner*—Ellen McAvoy
*Attorney, Agent, or Firm*—Russell L. Brewer; James C. Simmons; William F. Marsch

[57] ABSTRACT

This invention relates to organic materials normally susceptible to gradual degradation in the presence of oxygen during use over an extended period of time and of the type in which it is customary to add an antioxidant thereto to prevent degradation. The improvement constituting the basis of this invention comprises including an alkenylated toluenediamine having one alkenyl group ortho to an amine group. More particularly, the alkenylated toluenediamines suited as antioxidants are represented by the formulas:

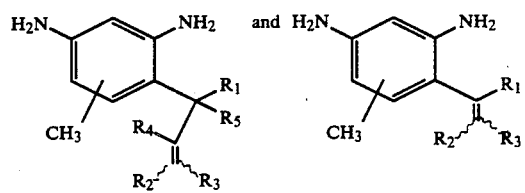

wherein $R_1$, $R_2$, $R_3$, $R_4$ and $R_5$ are hydrogen, $C_1$ to $C_3$ aliphatic, or $R_1$ and $R_2$ or $R_3$ are bridged via an alkylene radical —$(CH_2)_y$— wherein $y = 2$ to 5, and at least one of $R_1$, $R_2$, $R_3$, $R_4$ or $R_5$ is $C_1$ or greater.

6 Claims, No Drawings

ALKENYLATED TOLUENEDIAMINES AS ANTIOXIDANTS FOR ORGANIC MATERIALS

This application is a continuation-in-part of U.S. Ser. No. 768,885, having a filing date of Aug. 23, 1985, now U.S. Pat. No. 4,745,223, which is a continuation-in-part of U.S. Ser. No. 659,597, having a filing date of Oct. 11, 1984, now abandoned, and U.S. Ser. No. 837,461, having a filing date of Mar. 7, 1986, now U.S. Pat. No. 4,714,778, each being incorporated by reference.

DESCRIPTION OF THE PRIOR ART

Aromatic amines and N-alkylated aromatic amines have been long recognized as antioxidant materials for a variety of organic compositions such as rubber, plastics, fuel oil, lubricating oils, mineral oil, motor fuels and the like. The following patents are deemed representative of some of the prior art with respect to the use of aromatic amines as an antioxidant.

U.S.Pat. No. 2,645,674 discloses a method for producing a stabilized rubber adhesive composition by incorporating various amounts of aromatic diamine into the rubber as an antioxidant. Examples of aromatic amines include p-phenylenediamne; 1,5-naphthalenediamine; N-cyclohexyl-p-phenylenediamine and ortho-tolyl-β-napthylamine.

U.S. Pat. No. 3,230,257 discloses the preparation of nuclear and N-alkylated aromatic amines and the use of these aromatic amines is antioxidants in mineral oil, lubricating oils, etc. Aromatic amines which are suitable for alkylation include 2,4-dibutylaniline and ethylated p-toluidine. Phenylenediamines are suggested as candidate amines.

U.S. Pat. No. 3,923,892 discloses the manufacture of alkylated aromatic amines and suggests their use as antioxidant materials. Examples of aromatic amines include methyl bis(aniline) and p-phenylenediamines. Diisobutylaniline and 2,3,5,6-tetraethyl-1,4-diaminobenzene are also suggested.

U.S. Pat. Nos. 2,692,287 and 2,692,288 disclose the production of N-tert-alkylated aromatic amines and the use as antioxidants. Example 6 of the '287 patent shows the manufacture and use of N-tert-butyl-2,4-diaminotoluene as an antioxidant for lubricating oils.

U.S. Pat. No. 4,456,541 discloses the use of various aromatic diamines as antioxidant materials, and specifically alkylated derivatives of toluenediamine. Of these aromatic diamines, the diethylated derivatives of the 2,4 and 2,6-isomers of toluenediamine are shown as being particularly effective antioxidant materials.

SUMMARY OF THE INVENTION

This invention relates to the use of alkenylated toluenediamines as antioxidants for the prevention of oxidation of organic materials e.g. rubber and hydrocarbon oils which are susceptible to gradual degradation in the presence of oxygen during use over an extended period of time and of the type in which aromatic diamines have been added as an antioxidant. Although aromatic diamines have been known to exhibit antioxidant properties, alkenylated toluenediamines are particularly effective as an antioxidant in that it imparts substantially extended oxidation times to oils, lubricants, etc.

DETAILED DESCRIPTION OF THE INVENTION

The antioxidant materials of this invention are monoalkenylated toluenediamines. These aromatic diamine compositions are represented by the formulas:

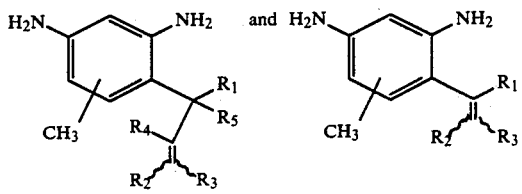

wherein $R_1$, $R_2$, $R_3$, $R_4$ and $R_5$ are selected from the group consisting of hydrogen, $C_1$ to $C_3$ linear or branched aliphatic or $R_1$ and $R_2$ or $R_3$ are bridged via an alkylene radical $—(CH_2)—y—$ wherein $Y=2$ to 5, and in said formula at least one of $R_1$, $R_2$, $R_3$, $R_4$ or $R_5$ is $C_1$ or greater. The structural formula have been written to reflect the stereo chemistry of the double bond.

In a particular embodiment of this invention, the above-mentioned formulae are represented by alkenylated diamine compositions having a five-membered ring of carbons atoms wherein $R_1$, $R_3$ and $R_4$ are hydrogen and $R_1$ and $R_2$ are combined to form a 5 membered ring. Additionally, this invention contemplates a diamine composition wherein $R_4$ and $R_5$ are hydrogen, R is $C_2$ aliphatic and $R_3$ and $R_5$ are combined to form a 5 carbon membered ring.

The compounds of this invention are synthesized by alkylating toluenediamine with a conjugated diene having from 4 to about 12 carbon atoms. It is because the alkenylation is effected via the amino group that one is able to introduce the alkenyl group in a position ortho to an amine group and achieve unique results associated with the specific regiochemistry associated with those isomers.

Much of the art describing the manufacture of alkenylated aromatic hydrocarbons uses a homogenous catalyst system, e.g., boron trifluoride or boron trifluoride-phosphoric acid mixture or weakly acidic heterogenous catalyst systems. Other art in the manufacture of alkylated aromatic amines uses bleaching earths, clays, montmorillonite and alkali metal ion exchanged zeolites. In contrast to the prior art method for producing alkenylated phenols and alkylated aromatic amines, it is our belief alkenylated aromatic amines are best prepared using silica-alumina or crystalline molecular sieves which are solid phase and have an acidity factor of at least 0.3 and preferably in excess of 0.8 as the catalyst. The acidity factor s a measurement of acidity of the zeolite catalyst and involves contact of the catalyst with ammonia under adsorpton conditions followed by desorption. More particularly, one gram of catalyst is contacted with ammonia at room temperature and then desorbed by heating to a temperature from ambient to 200° C. at a rate of 10° per minute, then holding at 200° C. for two hours. The amount of ammonia irreversibly adsorbed by one gram at 200° C. is indicative of acidity and indicative of the strength of the amine/acid bond. The acidity factor then is the amount of ammonia irreversibly adsorbed expressed in millimoles per gram of catalyst at 200° C. and as stated this level should be at least 0.3 and preferably 0.8 millimoles ammonia per gram of catalyst.

Zeolites which can be utilized for alkenylation of toluenediamines include X, Y, faujasite, ferrierite, offretite, chabazite, gmelinite, erionite. ferrierite, mordenite and the ZSM family. When initially prepared, the cation in the crystalline molecular sieve is an alkali metal, typically sodium. This ion must be exchanged in sufficient proportion, usually, 60% or greater, with an acidic ion such as a rare earth metal, e.g., lanthanum, praseodymium; hydrogen or some of the transition metals such as nickel, copper, chromium and the like. The substitution of various ions for the sodium ion alters the acidity of crystalline molecular sieve, thus making it more reactive and catalytically effective for ring alkenylation of the aromatic amine.

The naturally occurring and synthetic zeolites used in the process normally have a silica to alumina molar ratio from about 2 to 25:1. However, if the silica to alumina ratio is low or acidity borders on the low side of that desired, the silica to alumina ratio and acidity of the zeolite may be altered by a technique called dealumination. In effect, the practice of dealumination decreases the alumina content in the zeolite thereby increasing the silica to alumina ratio. The removal of alumina from the internal structure affects acidity and may also enlarge the cage structure or pore size of zeolite to permit entry of and diffusion of larger molecules into its internal structure. Thus, one may be able to utilize a particular cation in a dealuminated zeolite, but not use the same cation in its non-dealuminated state. This is because the original cation may not have provided sufficient acidity for effecting ring alkenylation of toluenediamne. Some of the techniques for dealumination include chelation, dehydration or acidification, the latter entailing the treatment of the zeolite with an inorganic acid. Techniques suited for dealumination of zeolites are well known.

Zeolites and crystalline molecular sieves are porous materials with the pores having generally uniform molecular dimensions. Cavities or cages are formed in this zeolite or molecular sieve and connected by channels of generally defined diameter. For the practice of this invention the pore diameter should be sufficiently large to permit the molecules to effectively enter the interior of the molecular sieve for reaction and to exit as final product. Typically, the pore size will range from about 6 to 15 Angstroms, but the size of a pore required for reaction can vary depending upon the product being produced. If conversion levels appear low for the particular catalyst, that level may be due to reactant diffusion resistance through the molecular sieve. If that is the case, a molecular sieve of slightly larger pore size should be tried.

Molecular sieves have been developed which have been defined as nonzeolites but have a cage structure that performs similarly to zeolites. In many cases, they contain alumina and silica in combination with other components, e.g, phosphorus, boron, germanium, titanium, etc. In the alkenylation of toluenediamines as described here, they perform similarly to zeolites, and representative crystalline molecular sieves are described in U.S. Pat. No. 4,440,871; European Patent No. 124,119 and European Patent No. 121,232 and the subject matter of these patents incorporated by reference. Borosilicate and borogermanate zeolites, although not disclosed in these patents, possibly can also be used. For purposes of practicing this invention, i.e., in the production of alkenylated toluenedamines, molecular sieves are deemed equivalent to and included as catalyst material.

The aromatic amine used in the alkenylation reaction is toluenediamine and the toluenediamine isomers include the 2,4-., 2,6-; and the 2,3 and 3,4-vicinal toluenediamine derivatives. The methyl radical is in the one position. The alkenylated toluenediamines are prepared by reacting toluenediamine with a diolefin in the presence of an acidic solid phase catalyst, particularly the crystalline molecular sieves as described.

Diolefins useful in this invention are acyclic and cyclic conjugated dienes. Examples of some dienes are 1,3-butadiene, isoprene, chloroprene, 2,3-dimethyl-1,3-butadiene, piperylene, 2-methyl-1,3-pentadiene, 2,4-hexadiene, 3,4-dimethyl-2,4-hexadiene, 2-phenyl-1,3-butadiene, 2-methoxy-1,3-butadiene, 2,5-dimethyl-2,4-hexadiene, cyclopentadiene, dicyclopentadiene, methylcyclopentadiene and 1,4-cyclooctadiene.

Some preferred compositions are listed below.

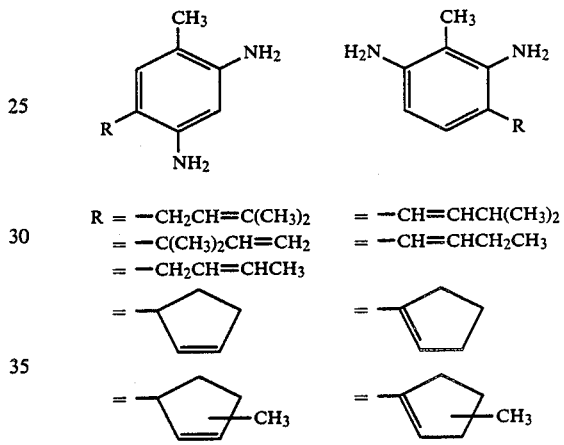

Ring alkenylation of the 2,4-and 2,6-as well as the vicinal 2,3- and 3,4-toluenediamines is effected by reacting toluenediamine with the diolefin at temperatures ranging from about 100° to 250° C. and preferably from about 140° to 220° C. The pressures will range from about 15 to 2000 psig and generally in the range of 100 to 1000 psig. It is common practice to alter the temperature and the pressure within the above ranges specified to optimize selectivity and conversion to the desired product. Mole ratios of olefin to toluenediamine used in the reaction will range from about 1:5 to 10:1 and the reaction time will generally be from about 2 to 48 hours when synthesized in an autoClave or within 0.05 to 6 hr −1, expressed as a liquid hourly space velocity (LHSV) for fixed bed continuous operation.

In the ring alkenylation of toluenediamines utilizing the solid acid catalyst systems, the diolefins, and particularly the olefins having conjugated unsaturation, tend to polymerize and generate substantial amounts of by-product polymer. In many Cases the combination of reactant and catalyst preclude the formation of alkenylated toluenediamines and substantially all of the olefin is converted to by-product polymer. Butadiene and cyclopentadiene are two offenders and both polymerize readily under the reaction conditions providing low yields of ring alkenylation. To avoid polymer production it is necessary to carry out the ring alkenylation of toluenediamine in the presence of a solvent which is inert to reaction with toluenediamine or the olefin and does not promote polymerization. Solvents which can be best utilized generally have a dielectric constant in the range of 1.5 to 3.0 and include paraffins such as pentane, hexane, heptane, octane, decane; toluene and xylene, paraffinic naphtha fractions, kerosene., and cycloparaffin hydrocarbons having from about 5 to 10 carbon atoms, e.g., cyclohexane and so forth.

The alkenylated toluenediamines may be used as pure isomers by themselves or as a mix for example in the form of the 2,4- and 2,6-isomer mix or in conjunction with a small amount of the alkenylated vicinal toluenediamine derivatives. A mixture of the 2,4-isomer and 2,6-isomer, in a weight ratio from about 65-80% of the 2,4- and 20-35% of the 2,6-isomer, is attractive for a number of reasons. One reason is that a commercial feedstock of toluenediamine typically contains 80% of the 2,4-isomer and 20% of the 2,6-isomer. If separation of the 2,4 and 2,6-isomers from the vicinal toluenediamine isomers is not effected, then from about 2 to 5% of the vicinal toluenediamine isomers may be present in that system.

The alkenylated toluenediamines described herein have been found to be excellent antioxidants for oils and rubber. The high antioxidant activity coupled with synthesis based on relatively inexpensive raw materials provides for products having a desirable cost/performance ratio. The alkenylated products have been evaluated for use in hydraulic oil and natural rubber, but it is believed the antioxidant properties will be generally useful for mineral oil, hydraulic oil, adhesives, sealants, coatings, elastomers, plastics, and petroleum products such as hydrocarbon fuels.

The following examples are provided to illustrate preferred embodiments of the invention and are not intended to restrict the scope thereof.

EXAMPLE 1

Preparation of 5-(cyclopent-2-enyl)-2,4-toluenediamine

A 200 g (1.64 mol) portion of 2,4-toluenediamine, 162 g (1.23 mol, 2.45 equiv) of dicyclopentadiene, 200 g (2.78 mol) of pentane, and 20.0 g of an amorphous alumina-silica catalyst comprised of 13% alumina and 87% silica were charged to a 1000 cc pressure vessel equipped with a mechanical stirrer. The vessel was sealed and purged with nitrogen leaving a 32 psig nitrogen blanket. The vessel contents were heated to 205° C. with stirring and were maintained at that temperature for 22 hr. The contents were cooled to 150° C. and isolated catalyst free by hot filtration. Selective removal of residual hydrocarbons by vacuum distillation and analysis by gas chromatography (GC) revealed the following product mixture:

|  | GC Area % |
|---|---|
| 2,4-toluenediamine | 36.02 |
| 3-(cyclopent-2-enyl)-2,4-toluenediamine | 2.51 |
| 5-(cyclopent-2-enyl)-2,4-toluenediamine | 57.34 |
| Other Aromatic Diamine derivates includng 3,5-di(cyclopent-2-enyl) 2,4-toluenediamine | 4.13 |
|  | 100.0% |

Converson of 2,4-toluenediamine = 64

The example shows that both positions ortho to each amine are reactive to alkenylation, but as one might expect, the 5 position is more . reactive than the 3-position. The dicyclopentadiene is cracked in situ, forming cyclopentadiene under the reaction conditions. Analysis of the hydrocarbons in the product mixture prior to distillation shows only cyclopentadiene and pentane present. No significant amounts of cyclopentadiene oligomers were formed.

The β,Y-unsaturated group may be isomerized to the α,β-configuration by contacting with base, e.g.. sodium hydroxide.

EXAMPLE 2

Preparation of 3-(cyclopent-2-enyl)-2,6-toluenediamine

A 200 g (1.64 mol) portion of 2,6-toluenediamine, 162g (1.23 mol, 2.45 equiv) of dicyclopentadiene, 200 g (2.78 mol) of pentane, and 20.0 9 of a catalyst comprised of 13% alumina and 87% silica were charged to a stirred vessel and reacted at 205° C. in a similar fashion as indicated in Example 1. Isolation of a catalyst free sample by hot filtration followed by selective removal of all residual hydrocarbon by distillation afforded the following product mixture:

|  | GC Area % |
|---|---|
| 2,6-toluenediamine | 51.32 |
| 3-(cyclopent-2-enyl)-2,6-toluenediamine | 43.67 |
| Other Aromatic Diamine including 3,5-di(cyclopent-2-enyl)-2,6-toluenediamine Derivatives | 5.02 |
|  | 100.0% |

Converson of 2,6-toluenedamine = 49%

Examples 1 and 2 show that both the 2,4- and 2,6-isomer of toluenediamine are reactive to alkenylation using an acidic silicaalumina catalyst in the presence of a solvent system.

EXAMPLE 3

Preparation of 3-(3-methylbut-2-enyl)-2,6-toluenediamine

A 200 g (1.64 mol) portion of 2,6-toluenediamine, 167 g (2.45 mol) of isoprene, 200 g (2.78 mol) of pentane, and 20 g of powdered H-Y zeolite were reacted at 150° C. in a similar fashion as indicated in Example 1. Isolation of a catalyst free sample was obtained by hot filtration. Selective removal of all residual hydrocarbon by vacuum distillation afforded the following product mixture:

|  | GC Area % |
|---|---|
| 2,6-toluenediamine | 50.30 |
| 3-(3-methylbut-2-enyl)-2,6-toluenediamine | 41.49 |
| Other Aromatic Diamine Including 3,5-di(3-methylbut-2-enyl)-2,6-toluenediamine derivatives | 8.21 |
|  | 100.0% |

Conversion of 2,6-toluenediamine = 50%

EXAMPLE 4

Preparation of 3-(3-methylbut-2-enyl) and 5-(3-methylbut-2-enyl)-2,4-toluenediamines A 200 g (64 mol) portion of 2,4-toluenediamine, 167 g (2.45 mol) of isoprene, 200g (2.78 mol) pentane, and 20g of a catalyst comprised of 13% alumina and 87% silica were reacted at 200° C. in a similar fashion as indicated in Example 1. Isolation of catalyst free sample was accomplished by hot filtration. Selective removal of all residual low boiling hydrocarbons by vacuum distillation afforded the following product mixture:

|  | GC Area % |
|---|---|
| 2,4-toluenediamine | 60.38 |
| 3-(3-methylbut-2-enyl)-2,4-toluenediamine | 12.23 |
| 5-(3-methylbut-2-enyl)-2,4-toluenediamine | 16.01 |
| Other Aromatic Diamine derivatives | 11.38 |
| including 3,5-di(3-methylbut-2-enyl)-2,4-toluenediamine derivates | |
|  | 100.0% |

Conversion of 2,4-toluenediamine = 40%

EXAMPLE 5

Antioxidant Testing in Hydraulic Oil

The test candidate toluenediamines, were evaluated for antioxidant properties for hydraulic oil. The evaluation was performed by the ASTM method D2272-67 entitled "Oxidation Stability of Steam Turbine Oils by Rotating Bomb" using Sunvis 21 (a light hydraulic oil) as the test oil. A good antioxidant will have an oxidation inhibition time (RBOT) greater than 150 min. at 0.5 wt.% utilization.

The chemicals designation and their respective test results are tabulated as follows:

| TEST COMPOUND | RBOT TIME MINUTES |
|---|---|
| Control Medium - Sunvis 21 Mineral Oil | 33 |
| 2-(cyclopent-2-enyl)-aniline | 92 |
| 2,4-toluenediamine (Comparison) | 118 |
| 2-(cyclopent-2-enyl)-para-phenylenediamine | 120 |
| 2,6-toluenediamine (Comparison) | 150 |
| Stalite S* (comparison) | 151 |
| 5-(cyclopent-1-enyl)-2,4-toluenediamine | 210 |
| 5-(cyclopent-2-enyl)-2,4-toluenediamine | 223 |
| 3-(cyclopent-1-enyl)-2,6-toluenediamine | 225 |
| 3-(cyclopent-2-enyl)-2,6-toluenediamine | 268 |
| 5-tert-butyl-2,4-toluenediamine (Comparison) | 277 |
| 3-(3-methylbut-2-enyl)-2,6-toluenediamine | 293 |

*a commercially available antioxidant

The cyclopentenyl derivatives of toluenediamine show good antioxidant activity having oxidation inhibition times in the range of 210–260 min. at 0.5 wt. % utilization. Similarly, excellent activity is observed for the prenyl derivative of 2,6-toluenediamine. Although not intending to be bound by theory the data show that the excellent antioxidant activity results from the presence of a $\alpha,\beta$- or $\beta,Y$-unsaturated moiety appended to the aromatic ring and the amine groups being meta to each other.

EXAMPLE 6

Antioxidant Testing in Natural rubber

The test candidate toluenediamines, i.e., 3-(cyclopent-2-enyl)-2,6-toluenediamine and 5-(cyclopent-2-enyl)-2,4-toluenediamine were evaluated for antioxidant properties in rubber. The evaluation was performed by a conventional ASTM method and compared against the cOmmercial antioxidants Agerite Superlite Solid and Agerite Stalite S.

The sample compositions evaluated in this experiment are listed below.

| Compound | Antioxidant Compounds |
|---|---|
| Agerite | 1 |
| Superlite Solids | 2 |
| Agerite Stalite S | 3 |
| 3-(cyclopent-2-enyl)-2,6-toluenediamnine (3CPTDA) | 4 |
| 5-(cyclopent-2-enyl)-2,4-toluenediamine (5CPTDA) | 5 |
| 5-(cyclopent-2-enyl)-aniline (5CPA) (comparson) | 6 |

These compounds were incorporated into a rubber material and evaluated in accordance with the test procedures in Table I which follows.

TABLE I

Antioxidants in Natural Rubber

| Additve | Antioxidant Compound | | | | | |
|---|---|---|---|---|---|---|
|  | 1 | 2 | 3 | 4 | 5 | 6 |
| Smoked Sheet | 100 | 100 | 100 | 100 | 100 | 100 |
| Stearic Acid | 2 | 2 | 2 | 2 | 2 | 2 |
| Zinc Oxide | 5 | 5 | 5 | 5 | 5 | 5 |
| TiO2 | 20 | 20 | 20 | 20 | 20 | 20 |
| DIXIE CLAY | 50 | 50 | 50 | 50 | 50 | 50 |
| Camel WITE | 50 | 50 | 50 | 50 | 50 | 50 |
| Sulfur | 2.75 | 2.75 | 2.75 | 2.75 | 2.75 | 2.75 |
| ALTAX | 1 | 1 | 1 | 1 | 1 | 1 |
| METHYL TUADS | .1 | .1 | .1 | .1 | .1 | .1 |
| AGERITE SUPERLITE S | — | 2 | — |  |  |  |
| AGERITE STALITE S | — | — | 2 |  |  |  |
| 3CPTDA | — | — | — | 2 | — | — |
| 5CPTDA | — | — | — | — | 2 | — |
| 5CPA | — | — | — | — | — | 2 |
| Physical Properties | | | | | | |
| Press cures at 153° C. (307° F.) | | | | | | |
| Cured: 10 Minutes | | | | | | |
| 300% Modulus, psi | 990 | 890 | 910 | 1170 | 1130 | 1000 |
| Tensile, psi | 2290 | 2390 | 2350 | 2490 | 2300 | 2550 |
| % Elongation | 490 | 540 | 500 | 480 | 470 | 520 |
| Hardness | 55 | 55 | 53 | 57 | 58 | 56 |
| After Aging 2 Days in Test Tubes @ 100° C. (212° F.) | | | | | | |
| Tensile, % Retained | 34 | 67 | 87 | 84 | 87 | 70 |
| Elongation, % Retained | 53 | 70 | 86 | 83 | 81 | 70 |
| Hardness, Points Changed | +3 | +9 | +9 | +6 | +8 | +10 |
| After Aging 4 Days in Test Tubes @ 100° C.(212° F.) | | | | | | |
| Tensile,% Retained | 21 | 49 | 69 | 70 | 71 | 50 |
| Elongaton, % Retained | 24 | 56 | 72 | 71 | 68 | 57 |
| Hardness, Points Changed | +2 | +8 | +12 | +7 | +7 | +9 |
| G.E. Brightness - Before and After 24 Hours Under R.S. Lamp | | | | | | |
| Before Exposure | 54.7 | 54.6 | 55.8 | 34.6 | 20.3 | 48.3 |
| After Exposure | 31.9 | 26.8 | 26.4 | 3.3 | 3.7 | 8.4 |

After aging 2 and 4 days in test tubes at 100° C. (212° F.) all of the toluenediamines showed antioxidant tensile and elongation properties and were better than the control (Compound 1) and the aniline homolog. In comparison with AGERITE SUPERLITE SOLID, all of the compounds showed comparable or slightly better retention of original physical properties, but developed compounds that were darker in color. In comparison with AGERITE STALITE S, the cyclopentenyl derivatives of TDA developed similar retention of original physical properties after aging but developed compounds considerably darker in color. (Color is normally not a commercial consideration for this application.)

What is claimed is:

1. In an organic material composition selected from rubber, oil, plastics and hydrocarbon fuels normally susceptible to gradual degradation in the presence of oxygen during use over an extended period of time and of the type in which an aromatic diamine has been added, the improvement which comprises: adding to the organic material a 2,4- or 2,6- toluenediamine composition having an alkenyl substituent ortho to an amino group represented by the formula:

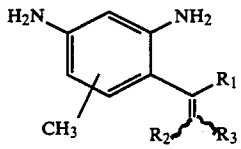

wherein $R_1$, $R_2$, and $R_3$ are selected from the group consisting of hydrogen, $C_1$ aliphatic, $R_1$ is bridged via an alkylene radical $-(CH_2)_y-$ with $R_2$ to form a ring wherein $y=2$ to 5 and provided in said group at least one $R_1$, $R_2$ and $R_3$ is $C_1$.

2. The composition of claim 1 wherein $R_1$, $R_2$, are hydrogen and $R_3$ is $C_1$ aliphatic.

3. The composition of claim 1 wherein $R_1$, is hydrogen and $R_2$ and $R_3$ are $C_1$ aliphatic.

4. The composition of claim 1 wherein $R_1$, and $R_2$ are hydrogen and $R_3$ is $C_2$ aliphatic.

5. The composition of claim 1 represented by the formula:

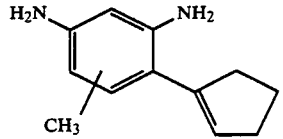

6. The composition of claim 1 represented by the formula:

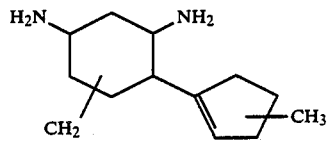

* * * * *